United States Patent
Kanome

(10) Patent No.: US 6,205,450 B1
(45) Date of Patent: Mar. 20, 2001

(54) COMPUTER SYSTEM CAPABLE OF RESTARTING SYSTEM USING DISK IMAGE OF ARBITRARY SNAPSHOT

(75) Inventor: Namiko Kanome, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/106,045

(22) Filed: Jun. 29, 1998

(30) Foreign Application Priority Data

Oct. 31, 1997 (JP) .................................................. 9-300916

(51) Int. Cl.$^7$ ...................................................... G06F 17/30
(52) U.S. Cl. ........................... 707/203; 707/204; 707/206
(58) Field of Search ..................................... 707/203, 204, 707/202, 205; 714/14, 19; 712/228; 711/114; 709/101

(56) References Cited

U.S. PATENT DOCUMENTS

| | | | |
|---|---|---|---|
| 5,287,496 | * | 2/1994 | Chen et al. ............................ 707/203 |
| 5,317,752 | * | 5/1994 | Jewett et al. ............................ 714/14 |
| 5,369,757 | * | 11/1994 | Spiro et al. .............................. 714/19 |
| 5,555,371 | * | 9/1996 | Duyanovich et al. .................. 714/13 |
| 5,613,113 | * | 3/1997 | Goldring ................................ 707/202 |
| 5,649,152 | * | 7/1997 | Ohran et al. ........................... 711/114 |
| 5,701,480 | * | 12/1997 | Raz ........................................ 709/101 |
| 5,794,024 | * | 8/1998 | Golla et al. ............................ 712/228 |
| 5,819,292 | * | 10/1998 | Hitz et al. .............................. 707/203 |
| 5,845,295 | * | 12/1998 | Houseman et al. .................... 707/204 |
| 5,956,754 | * | 9/1999 | Kimmel .................................. 711/206 |
| 6,038,639 | * | 3/2000 | O'Brien et al. ........................ 711/114 |

OTHER PUBLICATIONS

"File System Design for an NFS File Server Appliance", USENIX Association, Winter Conference, Jan., 1994, pp. 235–246.

"The Episode File System", USENIX Association, Winter Conference, Jan., 1992, pp. 43–60.

* cited by examiner

Primary Examiner—Wayne Amsbury
Assistant Examiner—Thuy N. Pardo
(74) Attorney, Agent, or Firm—Finnegan, Henderson, Farabow, Garrett & Dunner, L.L.P.

(57) ABSTRACT

A disk snapshot section inserted between a file system and a disk unit appropriately takes a snapshot that holds the contents of files stored in the disk unit at a predetermined timing, and stores the snapshot in the disk unit. The disk snapshot section sets a virtual disk drive which stores files having the contents held by the designated snapshot upon restarting the system, and makes the file system recognize the virtual disk drive. The system can be easily restarted using a disk image of an arbitrary snapshot.

15 Claims, 12 Drawing Sheets

DO YOU WISH TO RESTART THE SYSTEM
WITH THE SNAPSHOT AT 16H 20M 50S,
MARCH, 1998 (Y/N) ? [Y]

FIG. 15

DO YOU WISH TO RESTART THE SYSTEM
WITH THE SNAPSHOT AT 16H 20M 50S,
MARCH, 1998 (Y/N) ? [Y]

FIG. 16

DO YOU WISH TO RESTART THE SYSTEM
WITH THE SNAPSHOT AT 16H 20M 50S,
MARCH, 1998 (Y/N) ? [N]

FIG. 17

| NUMBER OF TIMES FOR WHICH BLOCK DATA HAS BEEN WRITTEN | DATE AND TIME AT WHICH BLOCK DATA HAS BEEN WRITTEN |
|---|---|

FIG. 18

COMPUTER SYSTEM CAPABLE OF RESTARTING SYSTEM USING DISK IMAGE OF ARBITRARY SNAPSHOT

BACKGROUND OF THE INVENTION

This application is based on Japanese Patent Application No. 9-300916, filed Oct. 31, 1997, the content of which is incorporated herein by reference.

The present invention relates to a computer system which can appropriately take a snapshot that holds the contents of files stored in, e.g., a disk device at a predetermined time and, more particularly, to a computer system which can easily restart a system using a disk image of an arbitrary snapshot.

Conventionally, troubles of the disk itself can be coped with by adopting a redundant disk architecture. However, such redundant technique is not useful for software bugs, loss or alteration of data due to operation errors, virus affection, or the like, and serious troubles that may damage the disk storage unit itself. In order to cope with such problems, a snapshot or backup of the disk must be held.

The "snapshot" is a copy image of a file, disk, or the like at a certain time, and the contents of the file or the entire disk are copied to another location of an identical disk storage unit or another disk storage unit, thus forming the snapshot. When a program or data is lost or altered, the contents of the program, data, or the entire disk revert to the snapshot (copy image) formed immediately before such loss or alternation, thereby coping with such troubles.

On the other hand, the "backup" is the snapshot saved in another large-capacity storage medium (magnetic tape or the like). With this backup, even when the disk storage unit itself is lost (all the data therein are also lost), the program or data upon taking the snapshot can be restored by loading the backup onto a new disk storage unit.

Normally, upon taking the snapshot or backup, all the applications, their files of which are likely to be changed, must be quitted. If the applications are not quitted, the file or data may be changed during formation of a copy, and a correct snapshot or backup may not be taken. In other words, even if an illegal snapshot or backup is stored in a disk storage unit, the application program side may produce errors or erroneous operations, and the above-mentioned measure against the troubles cannot serve its purpose.

Since write access to the disk storage unit is normally faster than that to a large-capacity storage medium, the application quit period required upon forming a snapshot and backing it up to the large-capacity storage medium can be shorter than that upon directly backing up a file or disk image. Also, using the snapshot, the lost or altered program or data can be restored faster. When a backup is made on a sequential access medium such as a magnetic tape, much time is required to find and read out a specific file, resulting in poor efficiency.

On the other hand, a file system with a snapshot function, which can solve the above problem that an application program or programs must be quitted for a long period of time to take a snapshot or backup has been disclosed (reference 1: "The Episode File System", Proceedings of the Winter 1992 USENIX Conference, pp. 43–60, San Francisco, Calif., reference 2: "File System Design for an NFS File Server Appliance", Proceedings of the Winter 1994 USENIX Conference, pp. 235–2344, San Francisco, Calif.).

Such file systems (e.g., reference 2) are premised on the assumption that files have a tree structure having a root node as the start point. Upon forming a snapshot, a copy of the root node which builds such log structured file system and contains information, a snapshot of which is to be formed (a copy of the root node and intermediate nodes until a layer, data of which has been updated) is generated. The copied root node (snapshot root node) expresses a tree structure as a snapshot. The root node of the copy source expresses the tree structure of an active file system from/into which data are actually read out/written. Since the snapshot root node indicates the same node as the root node when it is generated, no disk space other than the root node copied for a new snapshot is required.

If the user has changed a certain data block, a new data block is written on a disk, and the active file system expressed by the root node is changed to indicate that new block. The original data block on the disk remains unchanged, and the snapshot root node still indicates the original data block. Hence, by designating the snapshot root node, a data block upon forming the snapshot can be referred to.

As described above, when the file system with the snapshot function is used, a snapshot can be formed by copying intermediate nodes up to a directory layer in which data has been updated to have the root node as the start point, and an application program or programs need not be quitted. Since the snapshot can be saved in a large-capacity storage medium parallel to execution of the application program, a backup can also be formed without quitting the application. Hence, the application program need not be quitted to save snapshot or backup data.

However, since the above-mentioned technique cannot be directly applied to a conventional UNIX file system, a new, dedicated file system (e.g., a new, dedicated database is created from the beginning) must be developed, and the technique cannot be directly applied to existing computer systems. Also, since the file system itself is premised on the assumption that it is expressed by a tree structure, the above technique cannot be applied to an extent-based file system such as NTFS (New Technology File System) available from Microsoft Corp. A file system normally has a large tree structure, and in order to update the above-mentioned data block in practice, all intermediate nodes located in the route must be copied, thus considerably deteriorating update performance after formation of the snapshot (when certain data has been updated, since an intermediate node must be created, and copies from the root node to that intermediate node must also be formed, as the tree structure becomes complicated, the processing volume increases). Furthermore, with the above-mentioned technique, since a dedicated file system must be created, if the functions of a conventional UNIX file system are used, and the snapshot function is also added, a software module must be formed to prevent errors in these functions. For example, when another function is to be added, the above-mentioned technique disturbs flexible software design.

BRIEF SUMMARY OF THE INVENTION

It is an object of the present invention to provide a computer system which can be directly applied to an existing computer system or file system, can efficiently take a snapshot, and can easily restart a system using a disk image of an arbitrary snapshot.

In order to achieve the above object, according to the present invention, a computer system, which comprises a file system for managing accesses including an update access from an application program to files stored in a nonvolatile storage unit, comprises snapshot management means, inserted between the file system and the nonvolatile storage unit, for taking a snapshot which holds contents of the files at a predetermined timing in units of nonvolatile storage units and storing the snapshot in each nonvolatile storage unit, and snapshot control means for controlling read/write accesses with respect to the nonvolatile storage unit, and reference to the snapshot.

According to another aspect of the present invention, a computer system, which comprises a file system for managing accesses including an update access from an application program to files stored in a nonvolatile storage unit, comprises snapshot management means, inserted between the file system and the nonvolatile storage unit, for taking a snapshot which holds contents of the files at a predetermined timing in units of nonvolatile storage units and storing the snapshot in each nonvolatile storage unit, and recognition means for making the file system recognize a virtual disk drive storing files having contents held by the snapshot taken by the snapshot management means and stored on the nonvolatile storage unit, thereby allowing easy restart of a system using a disk image of an arbitrary snapshot.

According to the present invention, a snapshot can be efficiently taken without modifying the existing operating system, file system, or application program, and the system can be easily restarted using a disk image of an arbitrary snapshot selected according to the running state of the system. Hence, high system applicability and easy system management can be achieved at the same time.

In the computer system of the present invention, the snapshot management means preferably comprises snapshot taking timing means for controlling the taking timing of a snapshot, or snapshot taking instruction means for instructing taking of a snapshot.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 through 17 show display screen examples of inquiry messages;

FIG. 18 shows the contents of SS data 10 shown in FIG. 1; and

DETAILED DESCRIPTION OF THE INVENTION

The first embodiment of the present invention will be described hereinafter with reference to the accompanying drawings.

Figure 1:
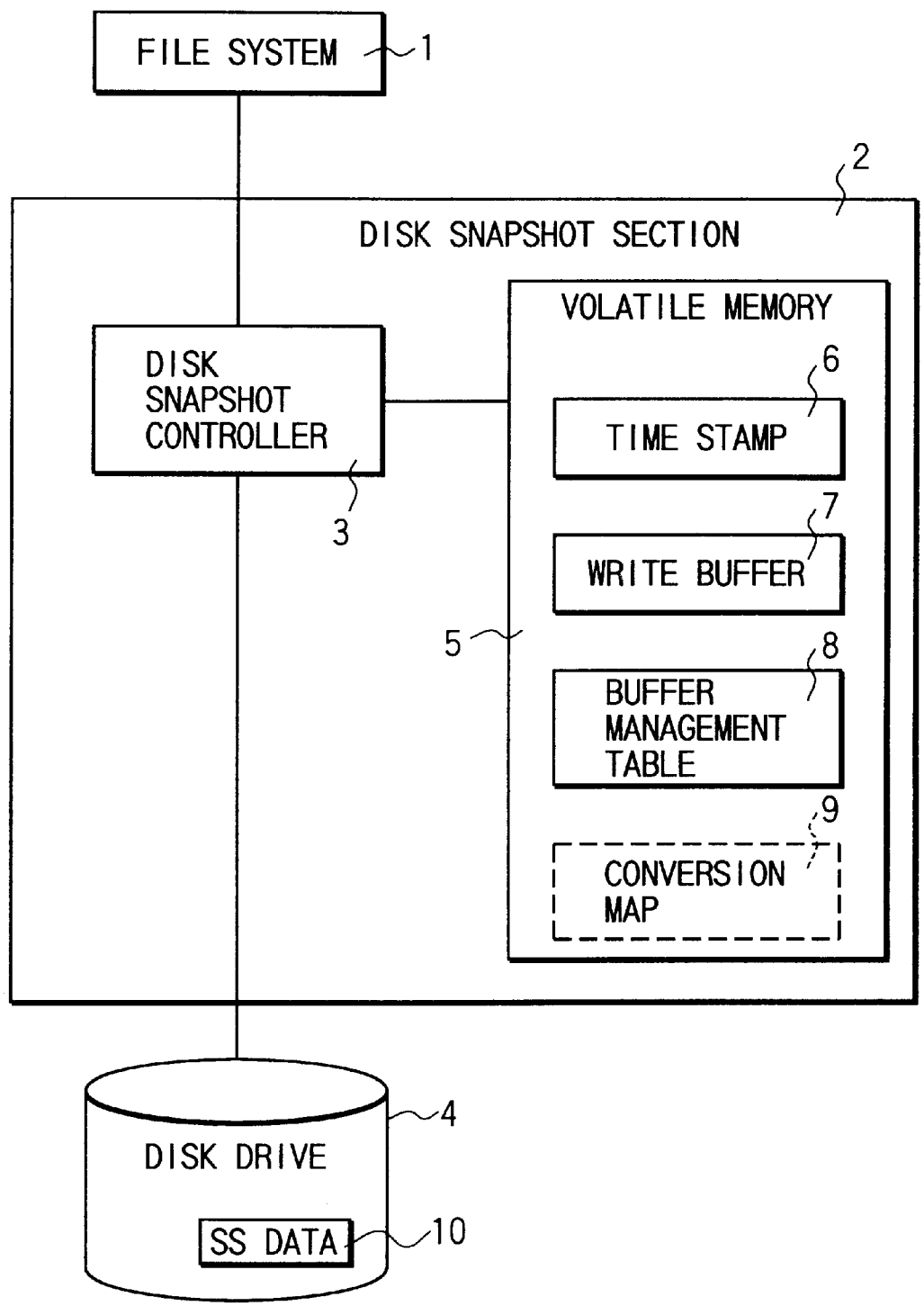
FIG. 1 is a block diagram showing the conceptual arrangement of a disk snapshot section that manages a disk snapshot in a computer system according to the first embodiment of the present invention.

The snapshot management method in this embodiment will be explained below. FIG. 1 shows the conceptual arrangement of a disk snapshot section that manages a snapshot in a computer system of this embodiment. As shown in FIG. 1, a disk snapshot section 2 of this embodiment comprises a disk snapshot controller 3 and volatile memory 5. The volatile memory 5 stores a time stamp 6 that maintains the temporal order of write accesses, a write buffer 7 for holding data to be written in a disk unit (nonvolatile storage unit) 4 in a log structure, and a buffer management table 8 for holding information of the logical addresses of an empty area and held write data in the write buffer 7. Furthermore, the disk unit 4 stores snapshot data (SS data) 10 for managing a snapshot in addition to normal data. As shown in FIG. 18, the SS data 10 contains the number of times block data has been written, and date and time information at which the block data has been written.

The disk snapshot controller 3 manages the time stamp 6, write buffer 7, buffer management table 8, and SS data 10, thus controlling read/write accesses and reference to a snapshot with respect to the disk unit 4.

Figure 2:
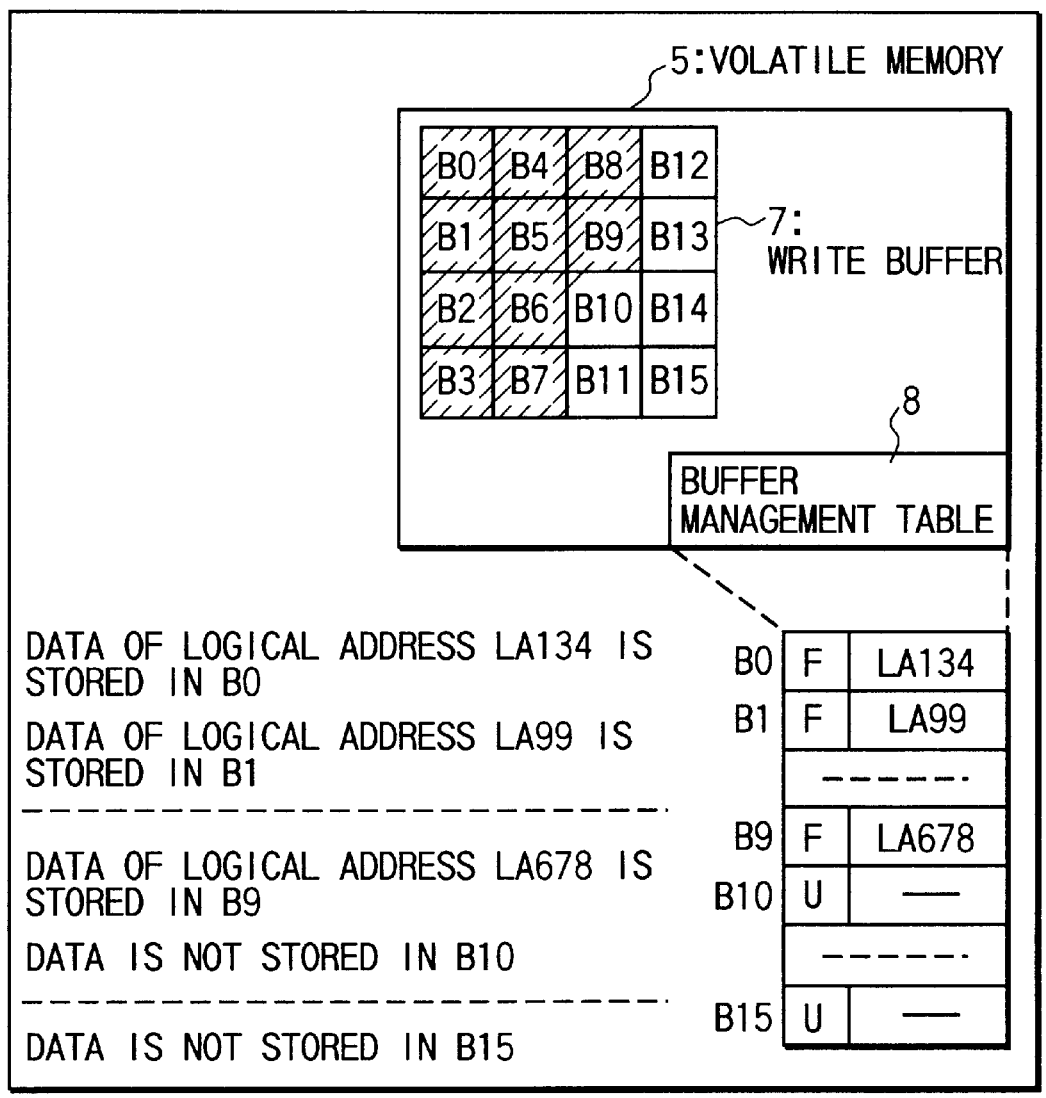
FIG. 2 exemplifies the contents of a write buffer and buffer management table of the first embodiment.

A data write will be explained below. In the disk unit 4, data are written in units of stripes each corresponding to an integer multiple (k) of the data block size. The disk snapshot controller 3 receives from a file system 1 data to be written (in this embodiment, the data has a variable length data size, but the present invention is not limited to this), and its logical address (e.g., virtual space address), and stores the data in an empty area of the write buffer 7 on the volatile memory 5 while segmenting data into blocks. Also, the controller 3 converts the received logical address into block addresses, and stores the converted addresses in corresponding entries of the buffer management table 8. FIG. 2 exemplifies the contents of the write buffer 7 and buffer management table 8.

Figure 3:
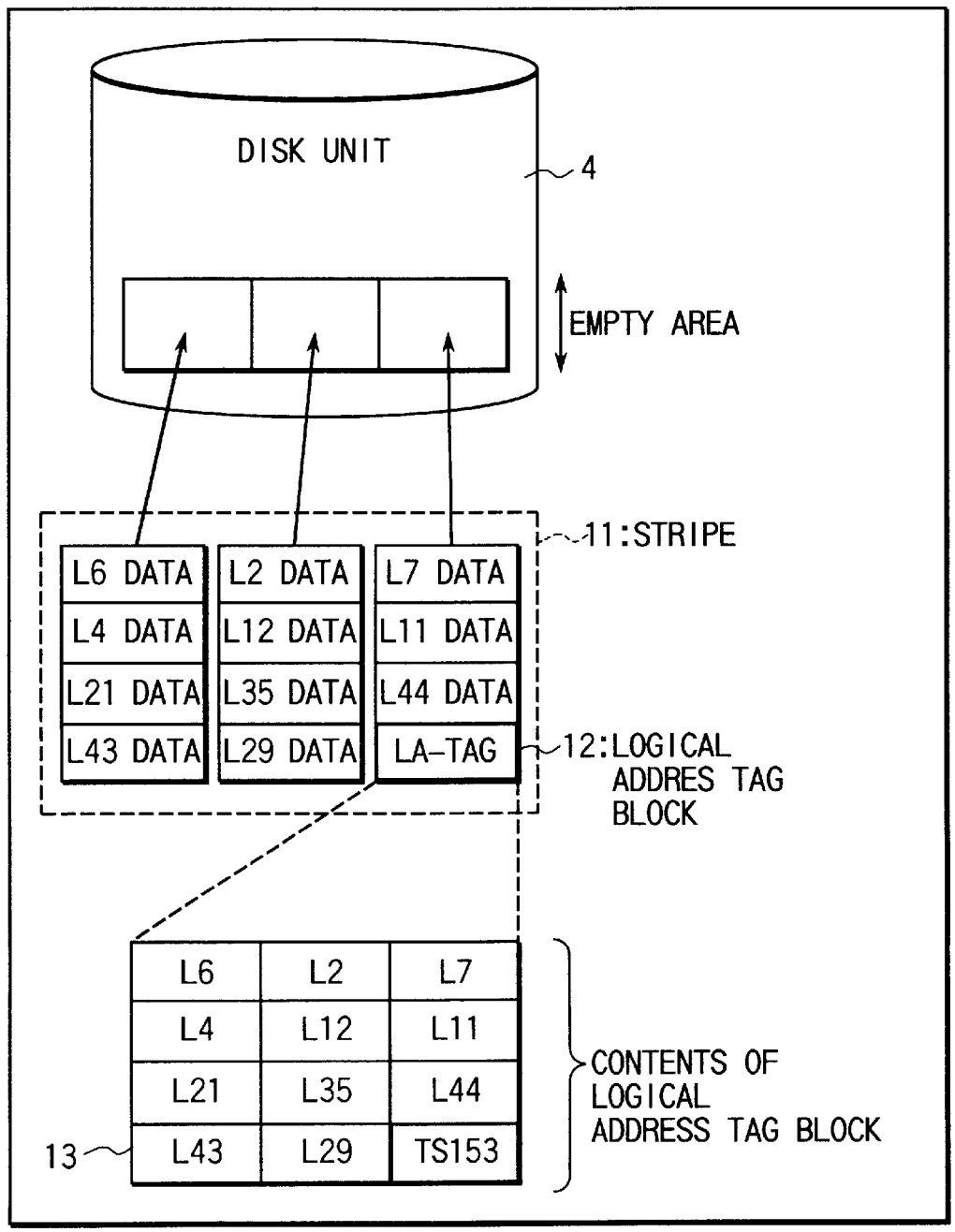
FIG. 3 is a view showing the state wherein the logical addresses and a time stamp of blocks on a stripe are stored in the last one block to form a logical address tag block, and that stripe is written in a disk unit in the first embodiment.

When write data from the file system 1 fewer by one from the number of blocks that define one stripe have been stored in the write buffer 7, the disk snapshot controller 3 stores the logical addresses and a time stamp of blocks on a stripe 11 in the last one block to form a logical address tag block 12, as shown in FIG. 3, and writes that stripe 11 in the disk unit 4. The value of the time stamp 6 is incremented upon completion of this write.

Figures 4, 5:
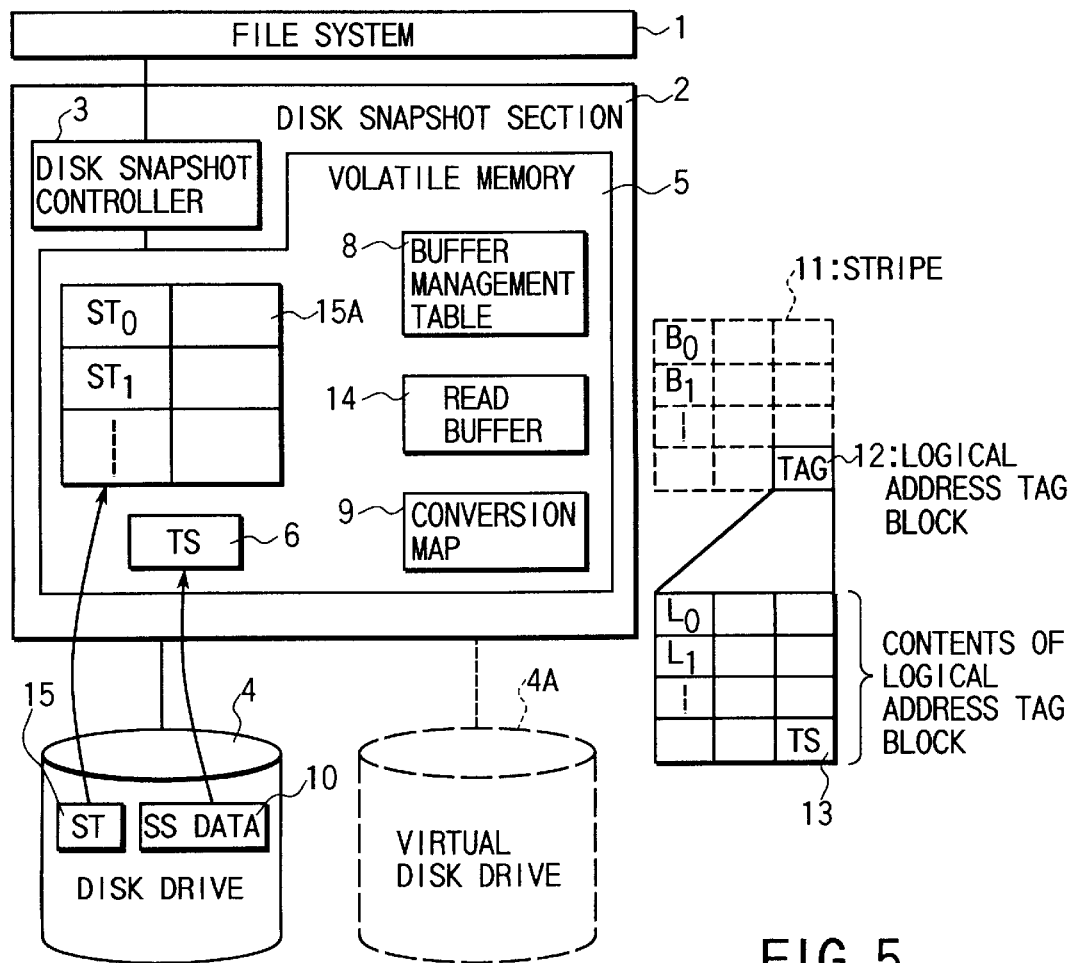
FIG. 4 shows the storage format of a conversion map of the first embodiment.
FIG. 5 is a diagram showing the arrangement of a system which uses the latest snapshot as a disk image upon starting a system in the second embodiment of the present invention.

As described above, upon updating data, since data is written in another empty area together with a time stamp in place of rewriting the corresponding physical area on the disk unit 4, a plurality of data blocks having identical logical addresses are present on the disk unit 4. In response to a normal data reference request, since the physical location of the latest data block must be returned, the logical address tags of all the stripes are checked upon starting the system, and a conversion map 9 from logical addresses to physical addresses is formed on the volatile memory 5. As shown in FIG. 4, the conversion map 9 holds stripe numbers ST# where the blocks of the respective logical addresses are stored, block numbers BLK# in these stripes, and their time stamps TS# in a table format. With this table, the physical location of each logical address block can be obtained.

Snapshot taking will be explained below. Upon reception of a snapshot taking instruction, the disk snapshot controller 3 writes data stored in the write buffer 7 at that time in the disk unit 4. At this time, the controller 3 sets a null value in those entries of the buffer management table 8 that correspond to empty areas on the write buffer 7. After that, the controller 3 forms a logical address tag block 12 as the last one block as in a normal write, and writes data blocks for one stripe. Furthermore, the value of the time stamp 6 added to the logical address tag block 12 at that time is registered in the SS data 10 in the disk unit 4 as information upon taking a snapshot. More specifically, the information upon taking the snapshot contains a value indicating the number of times for which block data has been written, and the date and time upon writing. Upon completion of registration, the controller 3 increments the value of the time stamp 6.

Reference to a snapshot will be explained below. In order to refer to an image of a certain snapshot, the same conversion map as that upon starting the system (the same conversion map as that of an active file system) is formed for all logical address blocks included in stripes having time stamp values smaller than that of the snapshot to be referred to, and access can be made using the snapshot reference conversion map.

More specifically, the operator reads the SS data 10 in the disk unit 4. The SS data 10 records the number of write times and the write date and time of each snapshot. The operator refers to the recorded write date and time to determine the snapshot to be referred to. When the snapshot to be referred to is determined, the disk snapshot controller 3 is informed of the write date and time of the snapshot to be referred to. The disk snapshot controller 3 searches the logical address blocks recorded in the disk unit 4 using the date and time designated by the operator to find a logical address block that is concordant with the designated write date and time. Upon finding the logical address block, the controller 3 re-arranges its logical address, stripe number (ST#), block number (BLK#), and time stamp TS# to reproduce the conversion map shown in FIG. 4. In order to obtain actual physical location information of a disk image, since management information that contains physical location information is embedded on the disk unit 4 as a feature unique to the relocatable log structured file which allows re-arrangement, the physical location information can be detected by loading such management information. As a result, the disk snapshot controller 3 accesses the disk unit 4 using the reproduced conversion map to read out the designated snapshot.

As described above, according to the disk snapshot management method of the first embodiment, a snapshot can be efficiently taken without altering the existing operating system, file system, or application program.

The second embodiment will be explained below. In the second embodiment, a technique for starting the system using a disk image of an arbitrary one of snapshots taken in the first embodiment will be explained.

FIG. 5 is a block diagram showing the arrangement of a system that uses the latest snapshot as a disk image upon starting the system in the second embodiment of the present invention.

A procedure for determining the latest snapshot as a disk image upon starting the system is as follows.

i) Upon starting the system, a disk snapshot controller 3 reads SS data 10 in a volatile memory 5 to obtain a time stamp (TS) 6 of the latest snapshot.

ii) The controller 3 then loads stripe management information (ST) 15 that records the position of an effective stripe 11 in a disk unit 4 onto the volatile memory 5.

iii) The controller 3 loads the effective stripe from the disk unit 4 onto a read buffer 14 on the basis of the stripe management information loaded onto a table 15A on the volatile memory 5, and compares a time stamp 13 of a logical address tag block 12 of the stripe 11 with the time stamp 6 of the latest snapshot.

iv) Only when the time stamp value 13 is smaller than the time stamp 6, the controller 3 registers the logical addresses, stripe number, block numbers of the data blocks, and time stamp included in the stripe 11 in the conversion map 9.

In case of this system, a stripe written after the latest snapshot is not used as the snapshot (since it is not settled as a snapshot).

v) When the time stamp 13 is larger than the time stamp 6, the controller 3 deletes the corresponding entry in the stripe management table 15A to invalidate that stripe.

Registration in the conversion map 9 is attained as follows.

The logical addresses of blocks in the logical address tag block 12 are compared with the logical addresses registered in the conversion map 9, and if a non-registered address is found, that address is registered. If the address is already registered, only when the time stamp value 13 is larger than the registered one, the corresponding entry is updated to register the address. This process is done for all the effective stripes in the disk unit 4 to form a conversion map. Using the formed conversion map 9, a disk image at the time of the latest snapshot can be accessed in the same procedure as in a normal case.

Figure 19:
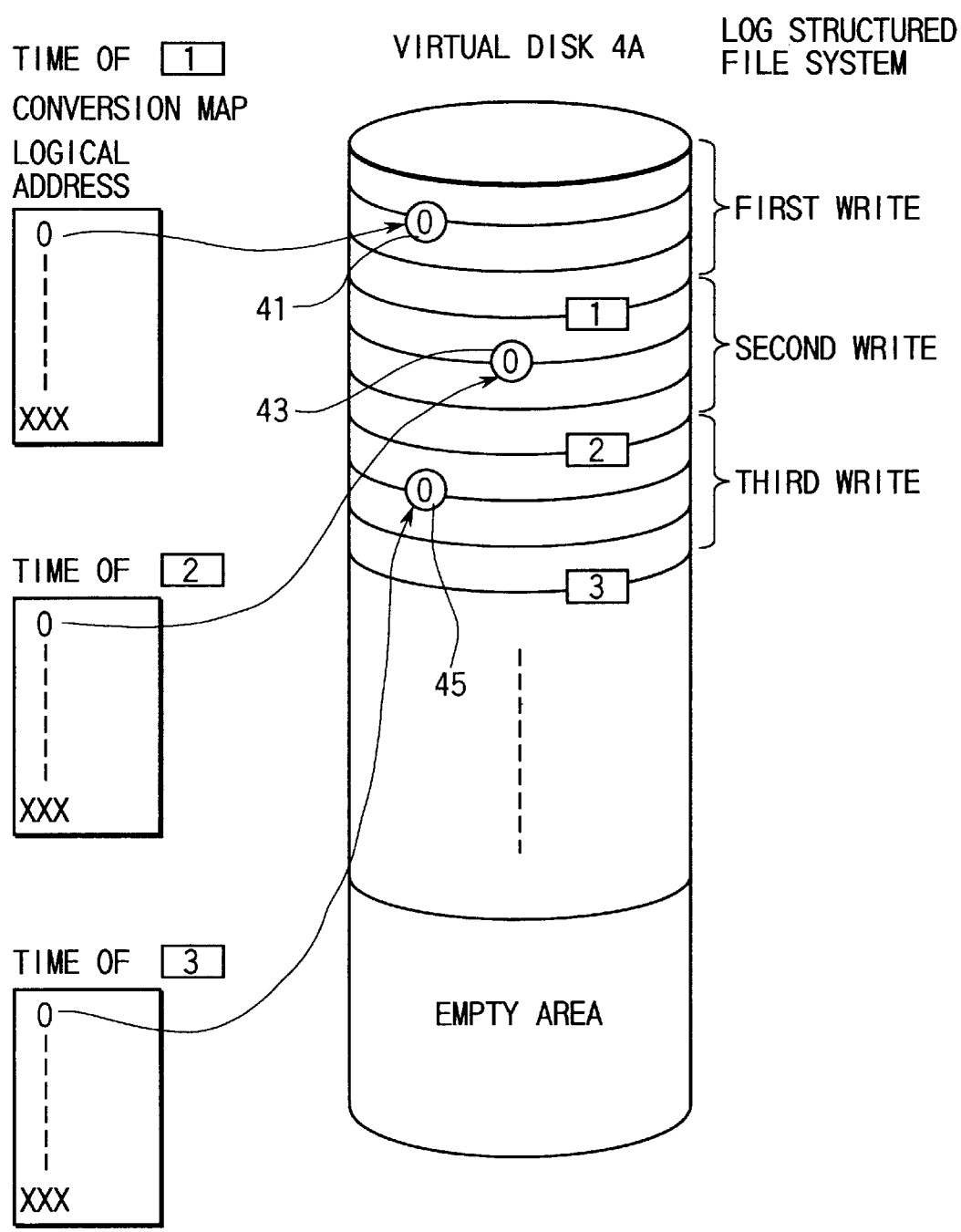
FIG. 19 is a view showing the concept of a virtual disk drive in the second embodiment of the present invention.

In a disk snapshot section 2 of this embodiment, the above-mentioned process is implemented by a virtual disk drive 4A. More specifically, as shown in FIG. 19, in case of the log structured file system, data with identical logical addresses are written in different storage areas on the disk unit 4 along with passage of time. That is, in FIG. 19, at time "1", data at logical address "0" is written at a physical location 41 on the disk unit 4. Furthermore, at time "2", data at identical logical address "0" is written at a physical location 43 on the disk unit 4. Moreover, at time "3", data at identical logical address "0" is written at a physical location 45 on the disk unit 4. With this arrangement, by forming a conversion map corresponding to the designated time stamp, a disk image corresponding to that time stamp can be presented as a virtual disk drive. Note that the virtual disk drive 4A stores the images of block data and logical address tag blocks.

In this embodiment, the virtual disk drive 4A may be built by, e.g., a logical partition, but a dedicated physical disk drive for a disk snapshot may be allocated. Alternatively, in case of a RAID disk system, the virtual disk drive 4A may be built on an array. More specifically, upon preparation of a file system 1 as the next process, the disk snapshot controller 3 presents the virtual disk drive 4A in place of the disk unit 4, a file system 1 that accesses the virtual disk drive 4A as a disk image is prepared, and an application program can be executed without requiring the controller to note that the disk drive 4A is virtual.

By adding a function of designating in advance a date and time to which the disk image is to be reverted upon system down, and a function of selecting the time stamp 13 of the latest snapshot before the designated date and time in the process of obtaining the time stamp 6 serving as a key from SS data 10 to the arrangement of the system shown in FIG. 5, the system can be restarted by reverting to the disk image before the designated date and time.

Furthermore, by adding a function of displaying the dates and times of effective snapshots 11 on the screen after the SS data 10 is read into the volatile memory 5, and a function of setting the time stamp 13 of the snapshot 11 selected by the operator from the displayed ones as the time stamp 6 serving as a key upon preparation of the conversion map 9 to the arrangement of the system shown in FIG. 5, the system can be restarted using a disk image at the time of the snapshot designated by the operator. The disk snapshot controller 3 inquires of the operator as to the time stamp of the snapshot to be set up. The operator determines the date and time of snap information to be set up by referring to the SS data 10 stored in the disk unit 4. The controller 3 then reads the SS data 10 from the disk unit 4 on the basis of the operator's designation, and retrieves snapshot information having the time stamp matching that designated by the operator. The controller 3 then prepares a conversion map of the snapshot information on the basis of the retrieved snapshot information. More specifically, the controller 3 reads the logical addresses and time stamp (TS#) from the logical address tag block, and the stripe number (ST#) and block numbers (BLK#) from the ST 15 (ST 15A), and prepares a conversion map corresponding to the snapshot designated by the operator in the format shown in FIG. 4. As a result, the disk snapshot controller 3 can set up the system using the disk image of the snapshot designated by the operator. At this time, when an option for always displaying a selection window is provided and checked, the system can be booted by selecting an arbitrary snapshot not only upon system down but also upon normal setup.

Figure 6:
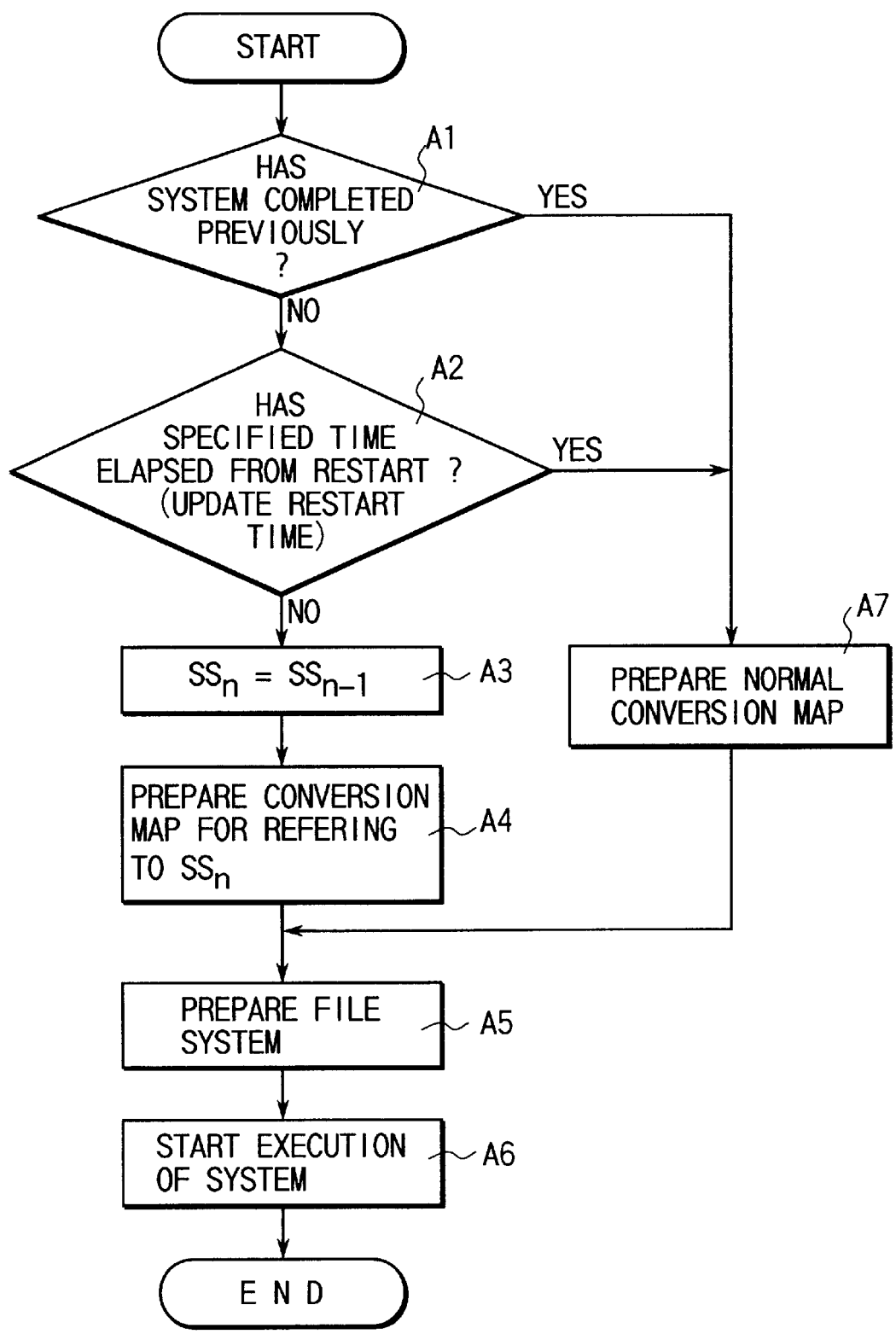
FIG. 6 is a flow chart showing the process flow upon booting a system which can be automatically restarted using an older snapshot when the system restart has failed in the second embodiment.

FIG. 6 is a flow chart showing the process flow upon booting the system that can be automatically restarted using an older snapshot when the system restart has failed. Elements that must be added to the system arrangement shown in FIG. 5 include the function of detecting if the previous start has failed, and the function of saving identification information of the snapshot used in the previous start.

In this case, the disk snapshot controller 3 checks if the system has completed its process previously (step A1). When normal termination is determined, the disk snapshot controller 3 saves time stamp information as a time indicating completion in the SS data 10 in a shutdown routine called from the file system 1 for a shutdown process. Hence, the controller 3 refers to this information to check if the system has completed its process previously. If it is determined in step A1 that the system has not terminated normally on the previous occasion, the disk snapshot controller 3 checks if the restart is the first one or that after the previous restart has failed (the first restart or the restart after disk crash) (step A2). To this end, the controller 3 compares the saved previous restart start time and the current time to examine if a specified time or a predetermined time has elapsed from the previous system restart time (attained by, e.g., checking the time stamp embedded upon taking a snapshot). At the same time, the controller 3 updates the restart start time by the current time.

If the restart is that after the previous restart has failed (N in step A2), the disk snapshot controller 3 selects a snapshot to be referred to one generation before the previously used snapshot, and updates the identification information of the snapshot used (step A3). More specifically, since the time stamp of the snapshot referred to in the previous restart is saved, the controller 3 searches the SS data 10 to select a snapshot one generation before that snapshot, and updates the time stamp 6 of the SS data 10 by the value of the time stamp 13 of the selected snapshot. The disk snapshot controller 3 prepares a conversion map 9 for referring to the selected snapshot using the time stamp 13 of this snapshot as a key (step A4). After the preparation, the controller 3 prepares a file system, and starts a normal setup process (steps A5 and A6).

As described above, the system can be automatically restarted using an older snapshot.

Figure 7:
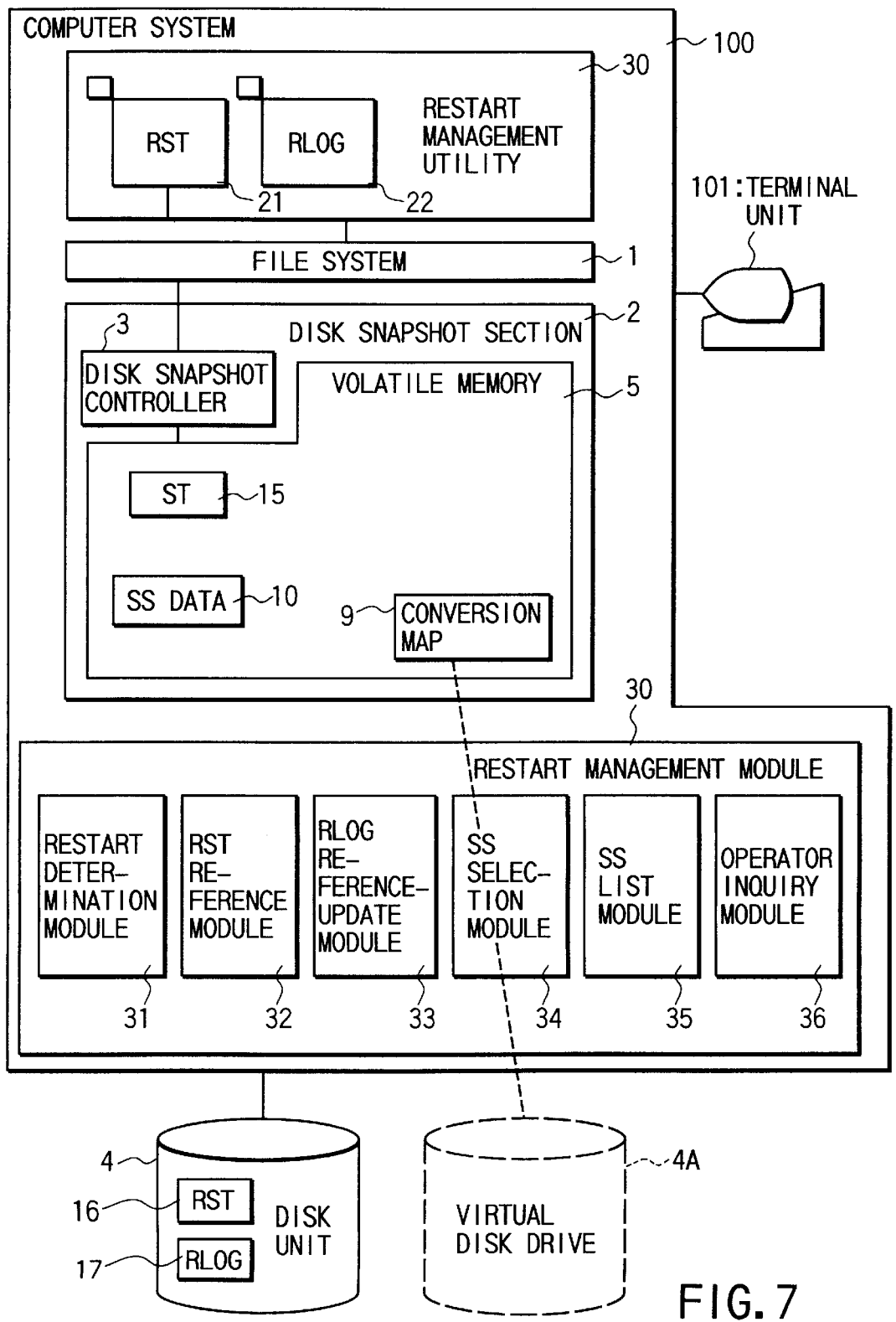
FIG. 7 is a block diagram showing the arrangement of a computer system which can implement restart using one of an auto mode for automatically restarting the system under predetermined conditions, and a manual mode for restarting the system via inquiries to an operator in the second embodiment.

The technique for implementing restart in one of an auto mode for automatically restarting the system under predetermined conditions and a manual mode for restarting the system via inquiries to the operator will be explained below. FIG. 7 shows the arrangement of a computer system that implements such restart.

As shown in FIG. 7, a computer system 100 comprises a terminal unit 101, which comprises an input device at which the operator makes instructions for the computer 100 and an output device for displaying the process results and other kinds of information.

This computer system 100 comprises a restart information setting module (RST) 21 that allows more precise restart designations in addition to the functions implemented by the above-mentioned system. The module 21 makes the operator set in advance restart conditions including an automatic/manual restart mode, designation of date and time of a disk image in the auto mode, a time T elapsed from the previous restart upon determining restart failure, the number N of retry times of restart in units of generations of snapshots, a limit value M for the number of generations upon using an older snapshot, and the like, and saves these conditions as restart setting information (RST) 16 in the disk unit 4.

In order to restart the system according to these conditions, since a restart log including the current number of times of restart, information indicating if the previous restart has failed, and the like must be saved and referred to, restart log information (RLOG) 17 is also saved in the disk unit 4. A restart determination module 31 for checking if the system has completed its process previously (step A1 in FIG. 6) is added, and the RLOG 17 is used for setting the number K of times of restart (from completion of the system). Furthermore, the current number n of retry times using the snapshot of the current generation, the current number m of generations that have been traced back, the restart start time, the time stamp of the snapshot used in start, and the like are saved as restart log information 17. Note that the generation is counted every time a snapshot is taken at predetermined time intervals or time intervals designated by the operator. The number of retry times is used to try restart of the system using a snapshot one generation before, when the system cannot be set up successfully even after retries designated by the number of retry times.

Figure 12:
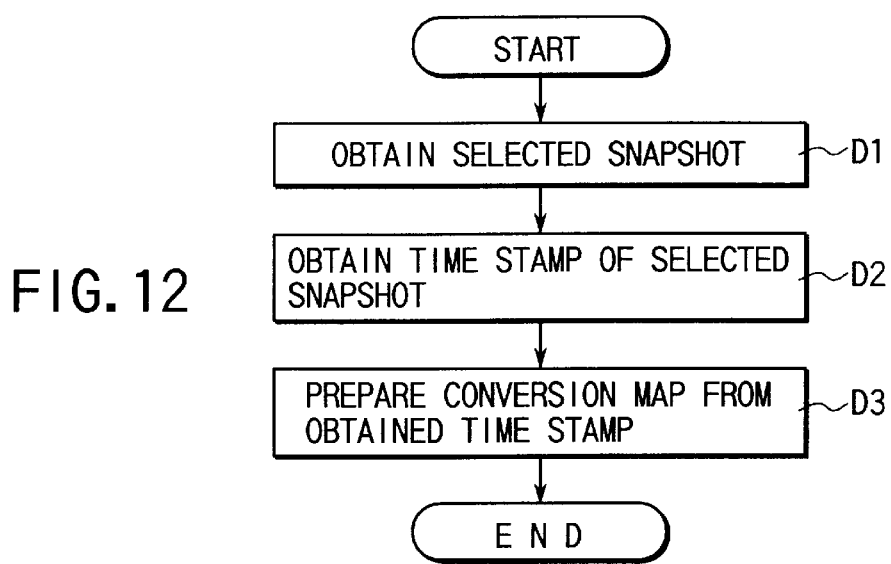
FIG. 12 is a flow chart showing the process of an SS selection module 34 shown in FIG. 7.

A snapshot selection module 34 for selecting a snapshot used in booting obtains the designated snapshot from the SS data 10 on the nonvolatile memory using the restart determination module 31, a restart setting information reference module 32, and a restart log information reference-update module 33 (step D1), as shown in the flow chart in FIG. 12. The module 34 then obtains the time stamp of the obtained snapshot (step D2). Finally, the module 34 instructs the disk snapshot controller 3 to prepare a conversion map 9 for referring to that snapshot, and presents the virtual disk drive 4A to the file system 1 as a disk image (step D3).

Figure 13:
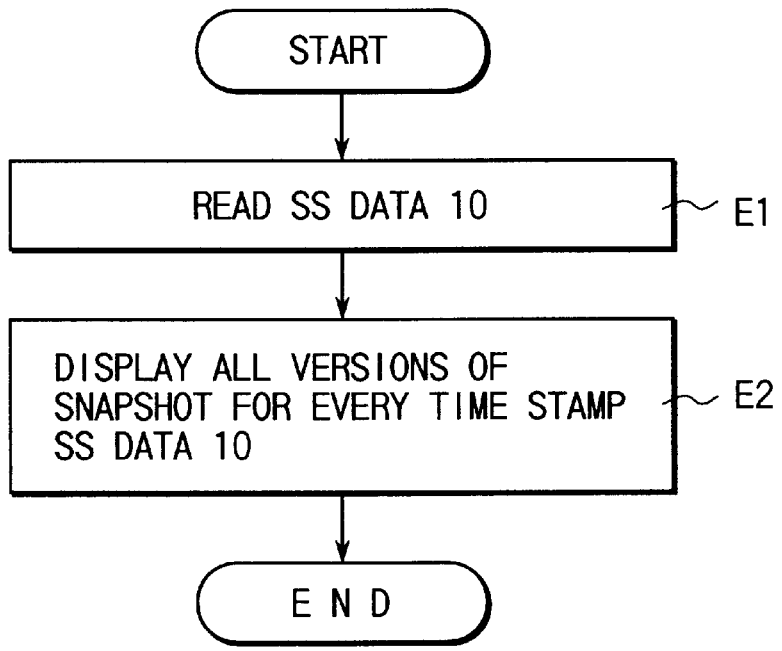
FIG. 13 is a flow chart showing the process of an SS list module shown in FIG. 7.
Figure 14:
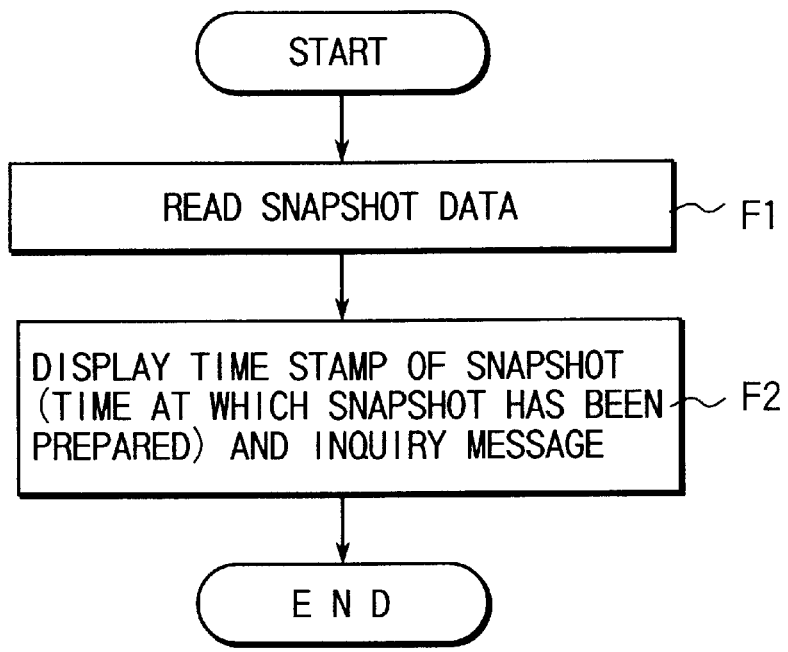
FIG. 14 is a flow chart showing the process of an operator inquiry module shown in FIG. 7.

When the operator selects a snapshot used in start, a selection window therefor must be displayed in a boot process before the file system 1 has been set up. For this purpose, a snapshot search-list module 35 is prepared to acquire the SS data 10. More specifically, as shown in FIG. 13, the SS data 10 is read from the volatile memory 5 (step E1), and all the versions of snapshots are displayed in units of time stamps of the SS data 10 (step E2). A list of snapshots is output to the terminal unit 101 via an operator inquiry module 36. More specifically, as shown in FIG. 14, the SS data 10 is read onto the read buffer 14 (step F1), and the time stamp of the snapshot (the time at which the snapshot has been prepared), and an inquiry message are displayed on the terminal unit 101 (step F2). FIG. 15 shows an example of the inquiry message at that time. In the example shown in FIG. 15, the operator selects the snapshot by inputting "Y" or "N". Alternatively, as shown in FIG. 16 or 17, "Y" or "N" may be displayed in advance as a default choice, and the user may select by pressing the enter key. A desired one of the displayed snapshots is selected. The module 36 informs the snapshot selection module 34 of the time stamp of the snapshot selected by the operator.

Note that the control modules for these restart management processes are called a restart management module 30, and applications for restart management are called a restart management utility 20.

Figure 8:
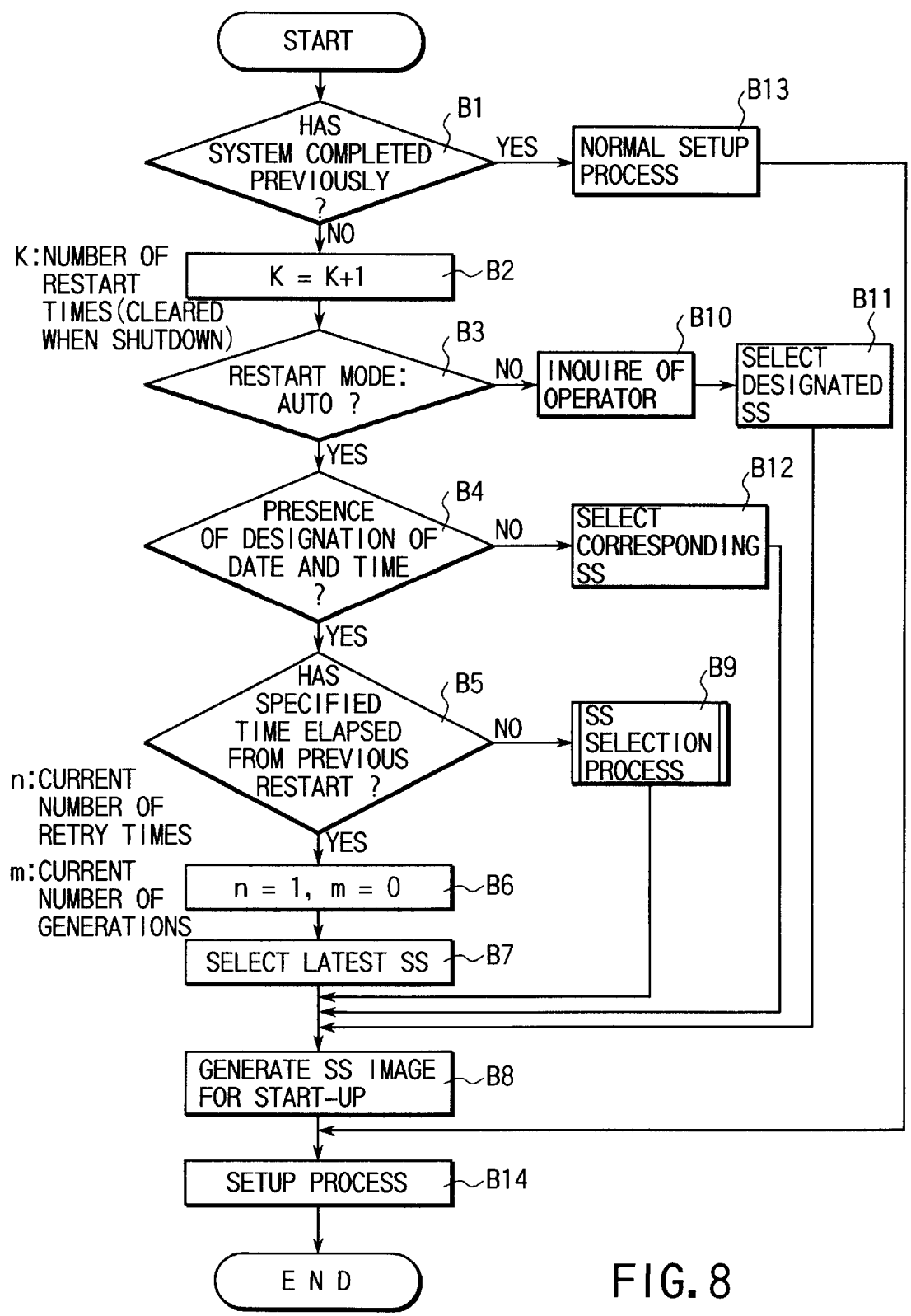
FIG. 8 is a flow chart showing the process flow executed by a restart management module upon booting in the second embodiment.

FIG. 8 is a flow chart showing the process flow executed by the restart management module 30 upon booting.

The restart management module 30 checks if the system has completed its process previously (step B1). This process is implemented by referring to information set by hardware or a basic system module in a predetermined area. If the system has not terminated normally (system down) (N in step B1), the restart management module 30 increments the number K of restart times in the restart log information 17 (step B2). The number K of restart times is cleared by the restart log reference-update module 33 upon shutting down the system (completion of the system).

The restart management module 30 checks if the designated restart mode in case of system down is an auto or manual mode (step B3). This process is implemented when the restart setting information reference module 32 refers to the corresponding information in the restart setting information 16.

If the designated restart mode is a manual mode (N in step B3), the module 30 requests the operator to select a snapshot, as described above (steps B10 and 1311), and the flow then jumps to step B8 (to be described later). On the other hand, if the designated restart mode is an auto mode (Y in step B3), the module 30 checks if the date and time of a start-up disk image have been designated (step B4). This process is done by referring to the restart setting information 16 as in step B3. If the date and time have been designated (Y in step B4), the snapshot selection module 34 selects the latest one of snapshots before the designated date and time (step B12), and the flow then jumps to step B8 (to be described later). If the date and time are not designated (N in step B4), the module 30 checks if a predetermined time has elapsed from the previous start (step B5). This is to check if the restart is the first one after completion or that after the restart has failed, and the restart log information reference-update module 33 refers to and updates the restart start time in the restart log information 17 as in step A2 in FIG. 6. A reference for the time elapsed from the previous restart used in this checking uses a prescribed value or is acquired from the restart setting information 16.

If it is determined that the designated time has elapsed from the previous start and the current restart is the first one (Y in step B5), the current number n of retry times is set at "1", and the current number of generations is set at "0" (step B6). After that, the latest snapshot is selected (step B7).

If the system down has occurred within the designated time from the previous restart (N in step B5), the flow advances to snapshot selection (step B9) to select a snapshot matching the conditions (i.e., a snapshot matching the time stamp designated by the operator).

A start-up disk image (virtual disk drive 4A) is generated based on the snapshot selected in the above processes (step B8). More specifically, the logical addresses are registered in the conversion map 9 using the time stamp of that selected snapshot as a key to prepare a conversion map 9 used for accessing the virtual disk drive 4A.

Figure 9:
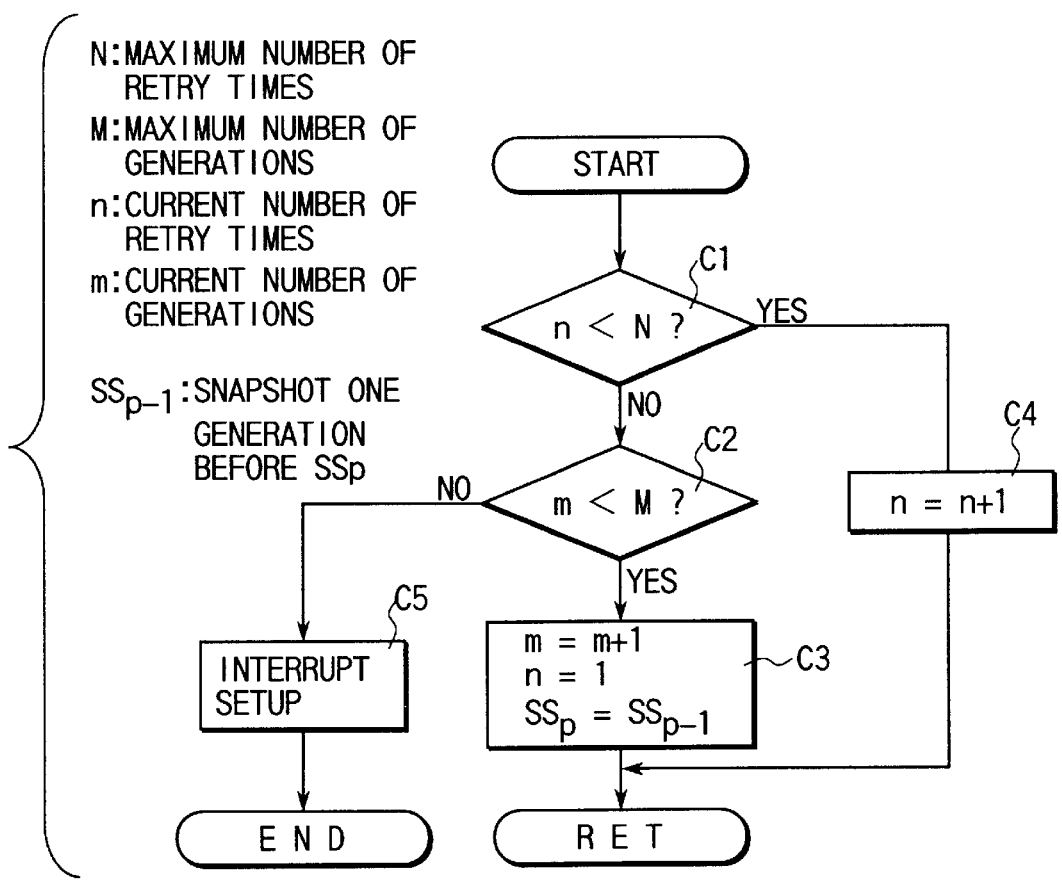
FIG. 9 is a flow chart showing the flow of snapshot selection in the second embodiment.

FIG. 9 is a flow chart showing the flow of the snapshot selection (step B9 in FIG. 8).

In this snapshot selection, the current number n of retry times is compared with the maximum number N of retry times (how many times the system is repetitively restarted using a snapshot of one generation) in the restart setting information 16 (step C1). If n<N (Y in step C1), since the same snapshot as that used in the previous restart (the snapshot of the currently selected generation) is to be selected, the current number of retry times is incremented (step C4), thus ending the process. Otherwise (N in step C1), the current number m of generations is compared with the maximum number M of generations (the number of generations to be traced back to automatically restart the system) to select a snapshot one generation before (step C2). If the current number m of generations has exceeded the maximum number M of generations (N in step C2), the setup process is aborted (step C5). In this case, a message indicating this is displayed or notified, and a log is recorded in the restart log information 17. On the other hand, if m<M (Y in step C2), the current number m of generations is incremented, the current number of retry times is set at "1", and a snapshot one generation before that used previously is selected (step C3). In this process, since the SS data 10 stores effective snapshots and their time stamps 6, a snapshot having the largest time stamp smaller than the time stamp 13 of the previously used snapshot saved in the restart log information 17 is selected from the snapshots in the SS data 10, and the time stamp 13 is updated by the time stamp 6 of the selected snapshot.

Figure 10:
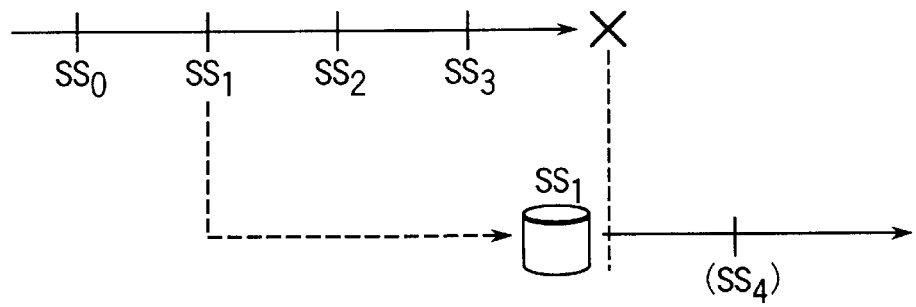
FIG. 10 is a view for explaining precautions to be taken when the system is restarted using a disk image other than the latest snapshot in the second embodiment.

With the above arrangement, the system can be restarted in one of the auto mode for automatically restarting the system under the predetermined conditions, and the manual mode for restarting the system via inquiries to the operator. When the system is restarted using a disk image other than the latest snapshot, the relationship between snapshots taken after the snapshot used in start-up and the disk image after the restart must be considered. For example, as shown in FIG. 10, assume that system down has occurred after snapshot 3 (SS3), and the operator restarts the system using snapshot 1 (SS1). In this case, if snapshot 4 (SS4) is to be taken after restart, snapshots 2 (SS2) and 3 (SS3) must be invalidated before taking SS4. If snapshots 2 (SS2) and 3 (SS3) remain after snapshot 4 (SS4) has been taken, and if system down has occurred at that time, consistency of the disk image cannot be obtained. For this reason, a flag which is set ON upon selecting a snapshot other than the latest snapshot in step B9, B11, or B12 in FIG. 8 is allocated in the restart log information 17, and is checked in the snapshot taking process by the disk snapshot controller 3. If the flag is ON, the corresponding snapshots (snapshots 2 (SS2) and 3 (SS3) in case of FIG. 10) are deleted. Upon deleting the snapshots, of the snapshots registered in the SS data 10, the entries of snapshots having time stamps larger than that of the snapshot used in restart are deleted, and the corresponding stripes are invalidated. This process can be done by searching the stripe management information 15 that registers the physical locations and time stamps of stripes, and invalidating stripes having time stamps, which are larger than that of the snapshot used in restart, and smaller than the restart start time.

Figure 11:
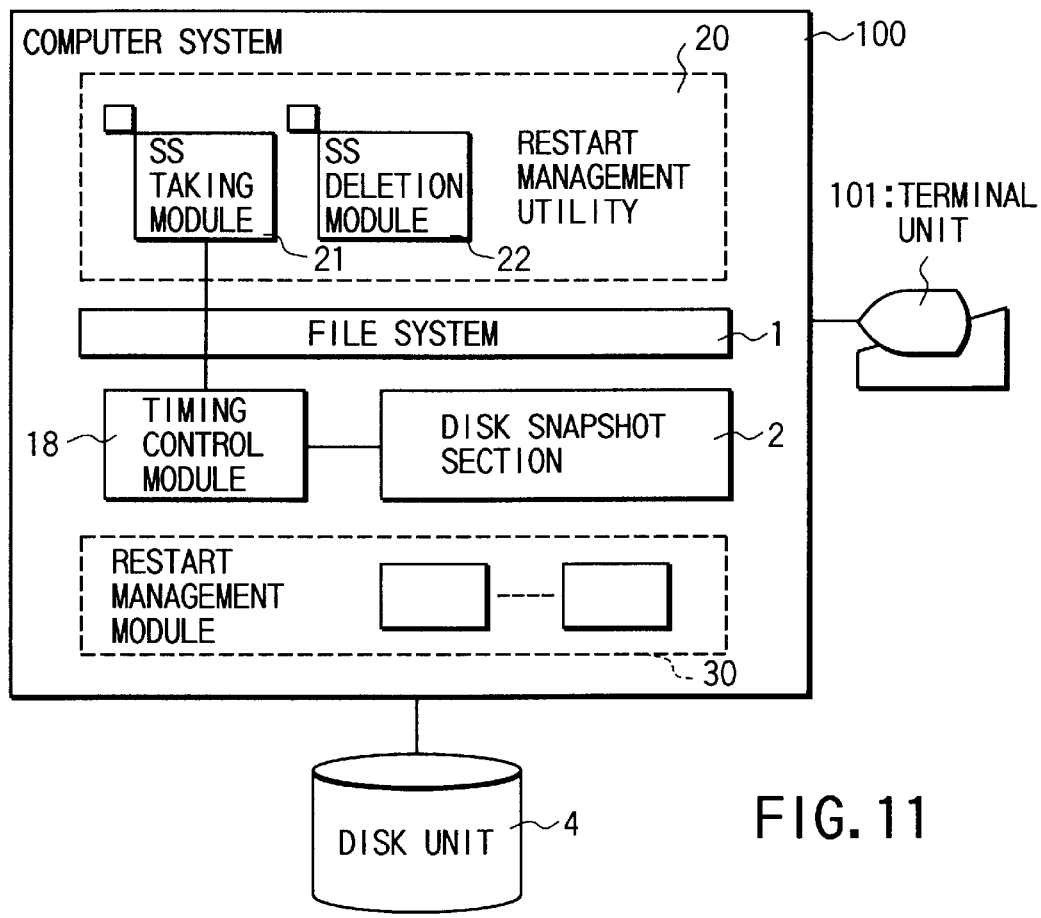
FIG. 11 is a block diagram showing a system that can change the snapshot taking timing in the second embodiment.

In this example, since the snapshots are invalidated before the first snapshot is taken after restart, if a setting means for inhibiting a snapshot from being taken is available, snapshots 2 (SS2) and 3 (SS3) may be left after the restart. In such case, for the purpose of, e.g., tests, the system may be started using an image of snapshot 1 (SS1) or 0 (SS0), and may be started using snapshot 2 (SS2) or 3 (SS3) in the next restart. FIG. 11 shows the arrangement of a system that can change the snapshot taking timing.

In this system, the snapshot taking timing is controlled by a timing control module 18. Normally, the disk snapshot section 2 receives taking instructions at predetermined time intervals. However, by preparing the following function, the taking timing can be changed. More specifically, the system supervisor instructs the timing control module 18 of execution of snapshot taking and taking intervals by preparing a snapshot taking module 23 for designating the snapshot taking timing. The timing control module 18 issues a snapshot taking execution instruction to the disk snapshot section 2 at designated time intervals, and also immediately instructs execution in response to an instruction from the snapshot taking module 23. When the taking interval is set at "0", taking is inhibited.

Furthermore, in order to allow the operator to restart the system with designation that does not execute taking when the system with designation that executes taking has gone to system down, a module corresponding to the operator inquiry module 36 shown in FIG. 7 allows designation pertaining to snapshot taking, and the designation information is supplied to the timing control module 18 before system execution is started.

In the system having the restart log information 17 that allows more precise restart control, which can restart the system in one of the auto mode for automatically restarting the system under the predetermined conditions, and the manual mode for restarting the system via inquiries to the operator, a module for displaying or informing the restart log information 17 may be prepared as a component of the restart management utility 20, so that the restart log can be used in system diagnosis.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system, which can take and refer to a snapshot at a predetermined time from files stored in a disk unit, comprising:

a memory having a data buffer and in which stripe management data indicating correspondence between a plurality of logical addresses and data blocks, a conversion map between logical addresses and physical addresses, and a time stamp are stored, the data buffer storing one stripe of data comprising a plurality of data blocks and a logical address tag block including logical addresses of the plurality of data blocks and a time stamp;

write means for writing together in an empty area in the disk unit the plurality of data blocks and the logical address tag block as one stripe of data;

snapshot taking means for, in response to an instruction of taking the snapshot, writing as one stripe the data blocks and the logical address tag block prepared based on the data blocks stored in the data buffer at the time of taking the snapshot in the empty area in the disk unit by using the write means, and registering the time stamp at the time of taking the snapshot in a predetermined area in the disk unit;

means for storing, upon system start-up, a time stamp desired to be referred to from the time stamps stored in the disk unit in the memory and reading an effective stripe from the disk unit into the data buffer in accordance with the stripe management data; and disk access control means for comparing the time stamp of the logical address tag block of the effective stripe read into the data buffer with the time stamp stored in the memory and registering in the conversion map of the memory the correspondence between the logical addresses and the physical addresses of the stripe having the logical address tag block whose time stamp is smaller as a result of the comparison, and performing a disk access of the snapshot.

2. The computer system according to claim 1 wherein if the time stamp of the logical address tag block is larger in the comparison of the time stamp of the logical address tag block with the time stamp stored in the memory, the disk access control means deletes an entry of the stripe management data of the stripe and invalidates the stripe.

3. The computer system according to claim 1, wherein during the registration into the conversion map, the disk access control means compares the logical address in the logical address tag block of the stripe whose time stamp is smaller with the logical address registered in the conversion map, and registers the logical address in the conversion map if no identical logical address exists in the conversion map.

4. The computer system according to claim 1, wherein during the registration into the conversion map, the disk access control means compares the logical address in the logical address tag block of the stripe whose time stamp is smaller witn the logical address registered in the conversion map, and updates the entries and registers in the conversion map only the logical addresses whose time stamps are larger if identical logical address is already registered in the conversion map.

5. The computer system according to claim 1, wherein when the stripe and the time stamp are registered in the disk unit by the snapshot taking means, the value of the time stamp stored in the memory is updated.

6. The computer system according to claim 1, further comprising:
   date and time designating means for designating date and time to which the snapshot is to be reverted from a plurality of snapshots stored in the disk unit; and means for selecting the snapshot having the latest time stamp before the date and time designated by the date and time designating means from the time stamps stored in the memory upon system start-up; and
   wherein the conversion map of the stripe corresponding to the snapshot selected by the selecting means is prepared to thereby access the disk unit.

7. The computer system according to claim 6, wherein when the system is to be restarted by using an older snapshot, a snapshot to be referred to one generation before the previously used snapshot is selected, the conversion map of the stripe corresponding to the selected snapshot is prepared to thereby access the disk unit.

8. The system according to claim 1, further comprising:
   restart data setting means for storing the restart setting data set by an operator in the disk unit;
   means for storing in the disk unit at least the number of times k of restart, the number n (n is an integer of one or more) of retry times of the snapshot, the current number m of generations that have been traced back, and restart log data; and
   means for selecting the snapshot to be restarted by using the restart setting data and the restart log data.

9. The system according to claim 8, further comprising;
   restart determining means for determining upon booting whether or not the system has terminated normally and starting the restart by incrementing the number of times k of restart if the restart after the system down is determined;
   means for referring to the restart setting data to determine whether or not the restart is in an automatic mode or in a manual mode and for preparing the conversion map of the stripe corresponding to the snapshot selected in accordance with the determined mode;
   wherein an access is made to the disk unit in accordance with the conversion map.

10. The system according to claim 9, wherein if a mode of the restart is in the manual mode, the snapshot selecting means prepares the conversion map of the stripe corresponding to the snapshot selected by an operator and accesses the disk unit in accordance with the conversion map.

11. The system according to claim 9, wherein if the mode of the restart is in the automatic mode, the snapshot selecting means refers to the restart setting data and selects, if the date and time of the snapshot is designated, the latest snapshot before the designated date and time, prepares the conversion map of the stripe corresponding to the selected snapshot, and accesses the disk unit in accordance with the prepared conversion map.

12. The system according to claim 11, wherein upon determining from the restart log data and the restart setting data that date and time of the snapshot is not designated and the number n of retry times is the one after a predetermined period of time has been elapsed from the previous start-up, the snapshot selecting means selects the snapshot corresponding to the number n of retry times, prepares the conversion map of the stripe corresponding to the selected snapshot, and accesses the disk unit in accordance with the prepared conversion map.

13. The system according to claim 12, wherein the snapshot selecting means selects the latest snapshot if the number n of retry times is 1.

14. The system according to claim 8, wherein the restart log data includes the number n of retry times of the snapshot and the current number m of generations that have been traced back;
   the means for selecting the snapshot to be restarted compares the current number n of retry times with the maximum number N of retry times and selects the same snapshot as previous time if n<N, compares the current number m of generations with the maximum number M of generations if n>N, and interrupts the system setup if m>M, and selects a snapshot older by one generation than the previously used snapshot if m<M.

15. A method for taking and referring to a snapshot at a predetermined time from files stored in a disk unit, comprising:
   storing in a memory having a data buffer stripe management data indicating correspondence between a plurality of logical addresses and data blocks, a conversion map between logical addresses and physical addresses, and a time stamp, the data buffer storing one stripe of data comprising a plurality of data blocks and a logical address tag block including logical addresses of the plurality of data blocks and a time stamp;
   writing together in an empty area in the disk unit the plurality of data blocks and the logical address tag block as one stripe of data;
   writing, in response to an instruction of taking the snapshot, as one stripe the data blocks and the logical address tag block prepared based on the data blocks stored in the data buffer at the time of taking the snapshot in the empty area in the disk unit, and registering the time stamp at the time of taking the snapshot in a predetermined area in the disk unit;
   storing, upon system start-up, a time stamp desired to be referred to from the time stamps stored in the disk unit in the memory and reading an effective stripe from the disk unit into the data buffer in accordance with the stripe management data;
   comparing the time stamp of the logical address tag block of the effective stripe read into the data buffer with the time stamp stored in the memory and registering in the conversion map of the memory the correspondence between the logical addresses and the physical addresses of the stripe having the logical address tag block whose time stamp is smaller as a result of the comparison, and performing a disk access of the snapshot.

* * * * *

UNITED STATES PATENT AND TRADEMARK OFFICE
CERTIFICATE OF CORRECTION

PATENT NO. : 6,205,450 B1
DATED : March 20, 2001
INVENTOR(S) : Namiko Kanome

Page 1 of 1

It is certified that error appears in the above-identified patent and that said Letters Patent is hereby corrected as shown below:

Column 13, claim 4,
Line 5, "witn" should read -- with --.

Signed and Sealed this

Sixteenth Day of April, 2002

Attest:

Attesting Officer

JAMES E. ROGAN
Director of the United States Patent and Trademark Office